United States Patent [19]

Oka

[11] Patent Number: 6,052,131

[45] Date of Patent: *Apr. 18, 2000

[54] APPARATUS AND METHOD FOR GENERATING ANTIALIASED POLYGONS

[75] Inventor: Masaaki Oka, Kanagawa, Japan

[73] Assignee: Sony Computer Entertainment Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/821,199

[22] Filed: Mar. 20, 1997

[30] Foreign Application Priority Data

Mar. 22, 1996 [JP] Japan .................................. 8-066915

[51] Int. Cl.$^7$ .................................................. G06T 17/00
[52] U.S. Cl. ............................................................ 345/441
[58] Field of Search .................................... 345/441, 136, 345/138

[56] References Cited

U.S. PATENT DOCUMENTS

| | | | |
|---|---|---|---|
| 5,528,738 | 6/1996 | Sfarti et al. ............................. | 345/443 |
| 5,544,294 | 8/1996 | Cho et al. ................................ | 345/441 |
| 5,555,360 | 9/1996 | Kumazaki et al. ...................... | 345/136 |
| 5,657,436 | 8/1997 | Ashburn .................................. | 345/441 |
| 5,664,081 | 9/1997 | Saito ....................................... | 345/441 |

*Primary Examiner*—Mark R. Powell
*Assistant Examiner*—Huedung X. Cao
*Attorney, Agent, or Firm*—Fulwider Patton Lee & Utecht, LLP

[57] ABSTRACT

A first forming means forms a first line segment along an edge of a polygon which has been delineated on a picture memory. A second forming means forms a plurality of second line segments along the length of the first line segment. The second line segments are comprised of a plurality of pixels and are generally perpendicular to the direction of the first line segment. The values of the second-line-segment pixels may be found using the values of pixels lying on the first line segment. Alternatively, the values of the second-line-segment pixels may be found by interpolation using the values of pixels adjacent the pixels lying on the first line segment.

13 Claims, 16 Drawing Sheets

APPARATUS AND METHOD FOR GENERATING ANTIALIASED POLYGONS

This application claims priority under the International Convention based upon Japanese Patent Application No. P08-066915 filed Mar. 22, 1996.

BACKGROUND OF THE INVENTION

This invention relates to improvements in computer graphics systems and, more particularly, to a delineating method and apparatus employed in a computer graphics system, special effects device or a video game equipment employing a computer.

It is common practice in the prior art, as for example in a TV game machine for household use, personal computer or a computer graphics system, a picture generating device for generating data of a picture outputted and displayed on a television receiver, monitor receiver or a cathode ray tube (CRT), that is data of a display output picture, to provide a dedicated delineating device between a central processing unit (CPU) and a frame buffer for enabling high-speed processing.

In this regard, when generating a three-dimensional picture by the picture generating device, the CPU does not directly access a frame buffer, but performs geometric processing, such as coordinate transformation, clipping or light source calculations, for defining a three-dimensional shape as the combination of polygons, such as triangles or a quadrangle, to generate instructions for delineations in order to transfer the generated instructions for delineation to the delineating device.

By way of illustration, for generating a picture of a three-dimensional object, a CPU may first define the object as a combination of polygons.

The CPU generates delineating instructions corresponding to these polygons for delineating the three-dimensional picture derived from the object and transfers the delineating institutions to the delineating device.

The delineating device interprets the delineating instructions sent from the CPU to find the colors of all pixels making up a polygon and Z-values specifying the depth from the color data of the apex points and the Z-values. The delineating device then performs rendering processing for writing the pixel data in the frame buffer to delineate a figure in the frame buffer.

The Z-value is the information specifying the distance from the viewing point in a direction along the depth.

When delineating a polygon from the various polygons making up the object, the delineating device first interprets the delineating instructions from the CPU to find Y-coordinates of apex points of the polygon in order to find the maximum value $Y_{max}$ and the minimum value $Y_{min}$ of the Y-coordinate values.

The delineating device rounds up and rounds down the minimum value $Y_{min}$ and the maximum value $Y_{max}$ of the Y-coordinate values in order to find the horizontal lines of pixels intersecting the polygon. The delineating device finds the points of intersection of the polygon with these horizontal lines of pixels.

The delineating device then rounds down the values of the X-coordinates of the points of intersection in order to find the maximum value $X_{max}$ and the minimum value $X_{min}$ of the pixels comprised in the polygon.

In the horizontal pixel lines, the delineating device writes the pixels comprised within a range from the minimum value $X_{min}$ to the maximum value $X_{max}$ of the X-coordinate values for every horizontal pixel line in the frame buffer.

However, as a result of the polygon being delineated on a frame buffer by the above-described delineating device, a boundary edge of the polygon is jagged. This jagged state of the boundary of the polygon is referred to hereinafter as "jaggies."

The above-described delineating device may employ either a sub-pixel method or a background mixing method for eliminating the jaggies.

The sub-pixel method resides in delineating a polygon on the frame buffer with resolution higher than the actual display resolution and passing the polygon through a low-pass filter for decreasing the resolution to the actual display resolution for removing the jaggies.

However, with the delineating device employing a sub-pixel method, since delineation needs to be carried out with a resolution higher than the actual display resolution, it is necessary to provide a frame buffer having a resolution higher than actual display resolution, thus increasing the hardware scale of the delineating device.

On the other hand, the background mixing method finds the ratio of the inside portion of a polygon contained in a pixel when the real edge of the polygon intersects the pixel and to mix the color of the polygon with the background color by this ratio for removing the jaggies.

However, with the delineating device employing the background mixing method, the color of the background, which should not be visible, is mixed with the edge color thus producing the bleeding of the background color.

Accordingly, there has been a long existing need in the art for enhanced image data processing wherein delineation is accomplished with minimal hardware requirement and which avoids jaggies and bleeding of background color. The present invention clearly fulfills these needs.

SUMMARY OF THE INVENTION

Briefly, and in general terms, the present invention provides a new and improved graphics processing method and apparatus wherein high precision delineation is accomplished without background bleeding and jaggies and with a minimum of associated hardware.

By way of example, and not necessarily by way of limitation, the present invention is directed to a delineating system for delineating shape data made up of a polygon generated by computer graphics on a frame memory. According to the present invention, a line segment interconnecting apex points of a contour portion of a polygon delineated on the frame memory is overwritten on the contour portion.

In a delineating system of the present invention, the line segment is preferably overwritten on the contour portion using pixel values neighboring to the contour portion.

In accordance with the present invention, preferably a pixel value obtained on mixing the value of the background pixel with the pixel value of a contour portion overlapped with that of a neighboring polygon is overwritten on the contour portion.

In addition, preferably each pixel value on the above line segment is weighted and a pixel value interpolated with the pixel value on the line segment is selected depending on the weight value.

According to the present invention, a line segment interconnecting the contour portion of a polygon delineated on the frame memory is overwritten on the contour portion.

With the present delineating method, the object made up of polygons may be easily freed in its entirety from jaggies, thus preventing the color which inherently should not be displayed, such as the background color, from being displayed. Thus, with the present delineating method, high precision delineation can be achieved using a minimum of hardware.

It is also possible with the present delineating method and apparatus to prevent background bleeding from being produced to effect delineation to higher precision.

In addition, according to the present invention, a pixel value obtained on mixing the value of a background pixel with the pixel value of a contour portion overlapped with a neighboring polygon is overwritten on the contour portion overlapped with the neighboring polygon. Thus, with the present delineating method, it becomes possible to prevent jaggies of the object constituted by a polygon in their entirety even if there occur pixels completely overwritten by the neighboring polygon, thus realizing higher precision in delineation.

Furthermore, in the delineating system of the present invention, preferably each pixel value on the line segment is weighted and a pixel value interpolated with the pixel value on the line segment is selected depending on the weight value. Thus, with the present delineating method, the pixel values necessarily assume different values even if the same pixels are co-owned by neighboring polygons. Thus it becomes possible with the present delineating method to prevent background bleeding to realize higher precision in delineation.

Furthermore, in the delineating method according to the present invention, since the pixels for overwriting are generated by interpolation depending on the distance of the pixels from the above-mentioned line segment, it becomes possible to generate a more spontaneous picture using minimal hardware.

Hence, the present invention satisfies a long existing need for enhanced image processing delineation which reduces jaggies and background bleed and has minimal hardware requirements.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

Figure 1:
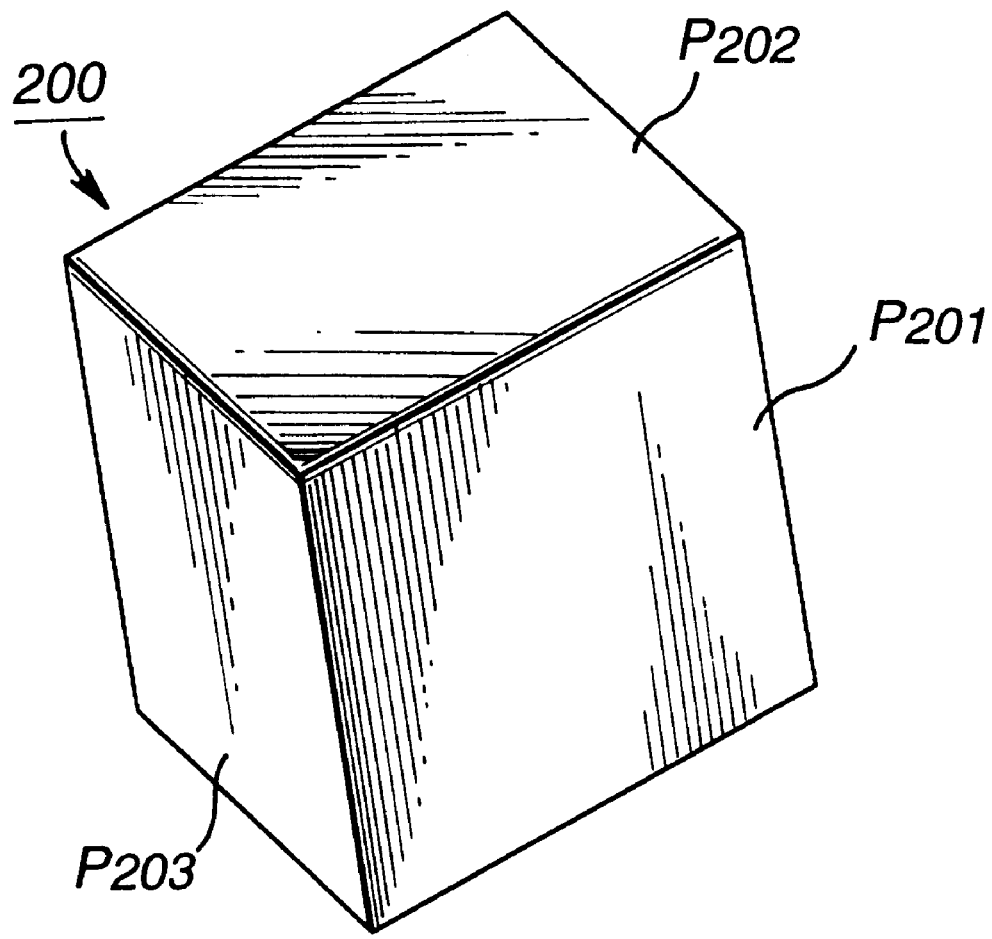
FIG. 1 illustrates a three-dimensional shape constituted by polygons.

Referring now to the drawings, like reference numerals denote like or corresponding parts throughout the drawing figures.

FIGS. 1–8 illustrate the prior art. Specifically, for generating a picture of a three-dimensional object 200 shown in FIG. 1, the system CPU (not shown) first defines the object 200 as the combination of polygons $P_{201}$, $P_{202}$ and $P_{203}$.

The CPU generates delineating instructions corresponding to the polygons $P_{201}$, $P_{202}$ and $P_{203}$ for delineating the three-dimensional picture derived from the object 200 and transfers the delineating institutions to the delineating device.

The delineating device interprets the delineating instructions sent from the CPU to find the colors of all pixels making up a polygon and Z-values specifying the depth from the color data of the apex points and the Z-values. The delineating device then performs rendering processing for writing the pixel data in the frame buffer to delineate a figure in the frame buffer.

The Z-value is the information specifying the distance from the viewing point in a direction along the depth.

Figure 2:
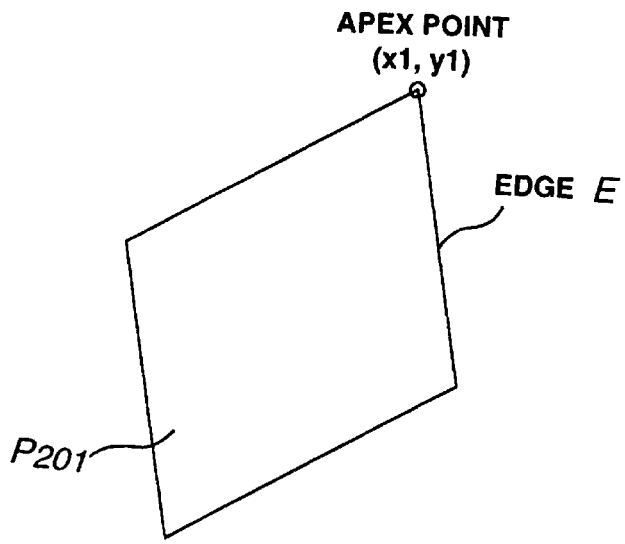
FIG. 2 illustrates a typical polygon from the shape shown in FIG. 1.
Figure 3:
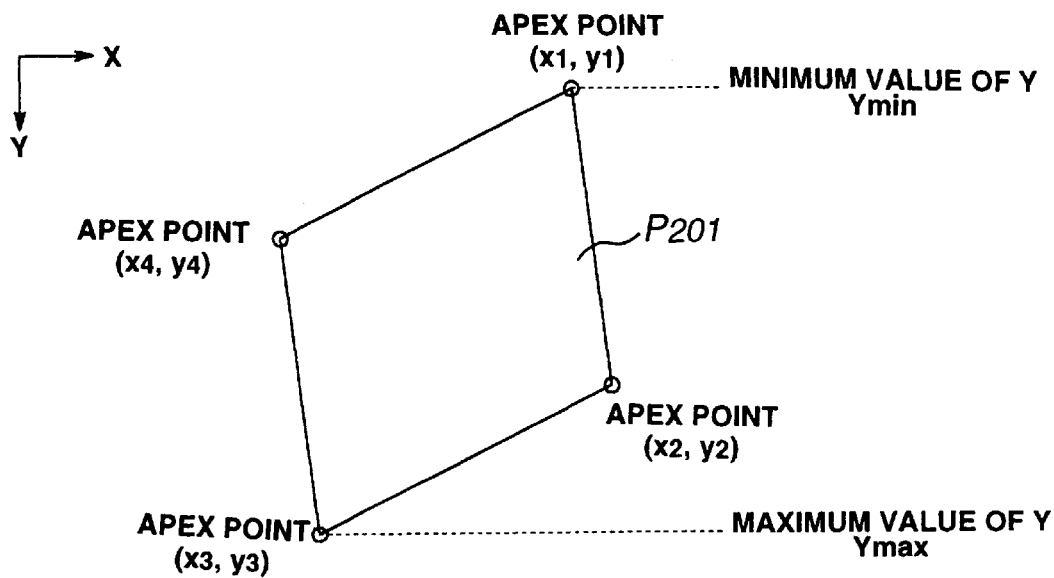
FIG. 3 illustrates the processing for finding the maximum and minimum values of the Y-coordinate at each apex point of the polygon shown in FIG. 2.

When delineating the polygon $P_{201}$ shown in FIG. 2 from the polygons $P_{201}$, $P_{202}$ and $P_{203}$ making up the object 200, the delineating device first interprets the delineating instructions from the CPU to find Y-coordinates y1, y2, y3 and y4 of four apex points (x1, y1), (x2, y2), (x3, y3), (x4, y4), of the polygon $P_{201}$ as shown in FIG. 3 in order to find the maximum value $Y_{max}$ (=y3) and the minimum value $Y_{min}$ (=y1) of the Y-coordinate values.

Figure 4:
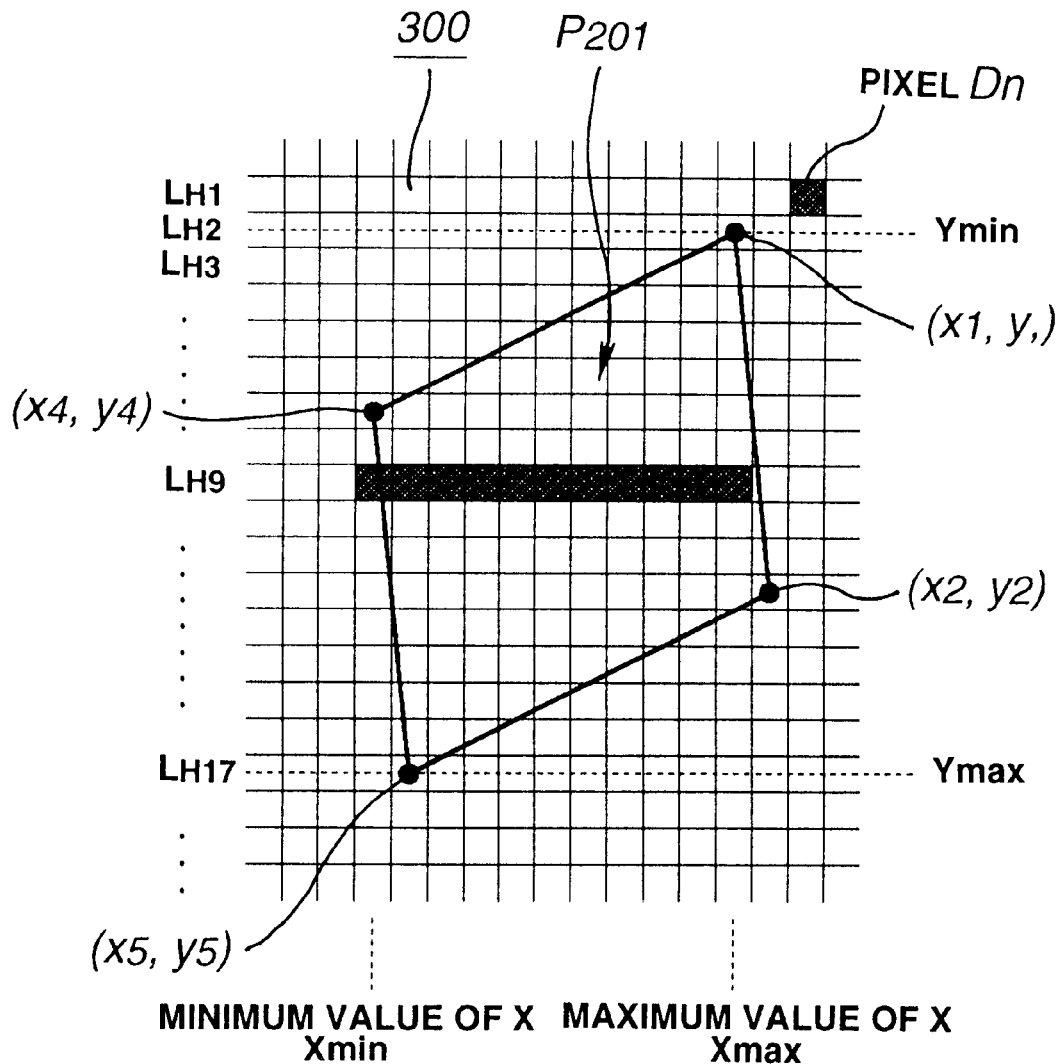
FIG. 4 illustrates the processing for finding the point of intersection of the polygon with a horizontal pixel line.

Referring to FIG. 4, pixels Dn in a frame buffer 300 are arrayed in a lattice. However, the four apex points (x1, y1), (x2, y2), (x3, y3), (x4, y4) of the polygon $P_{201}$ are not necessarily coincident with the lattice points.

Thus, the delineating device rounds up and rounds down the minimum value $Y_{min}$ and the maximum value $Y_{max}$ of the Y-coordinate values in order to find the horizontal lines of pixels $L_{H2}$ to $L_{H17}$ intersecting the polygon $P_{201}$. The delineating device finds the points of intersection of the polygon $P_{201}$ with the horizontal lines of pixels $L_{H2}$ to $L_{H17}$.

The delineating device then rounds down the values of the X-coordinates of the points of intersection in order to find the maximum value $X_{max}$ and the minimum value $X_{min}$ of the pixels comprised in the polygon $P_{201}$.

In the horizontal pixel lines $L_{H2}$ to $L_{H17}$, the delineating device writes the pixels comprised within a range from the minimum value $X_{min}$ to the maximum value $X_{max}$ of the X-coordinate values every horizontal pixel line in the frame buffer.

Figure 5:
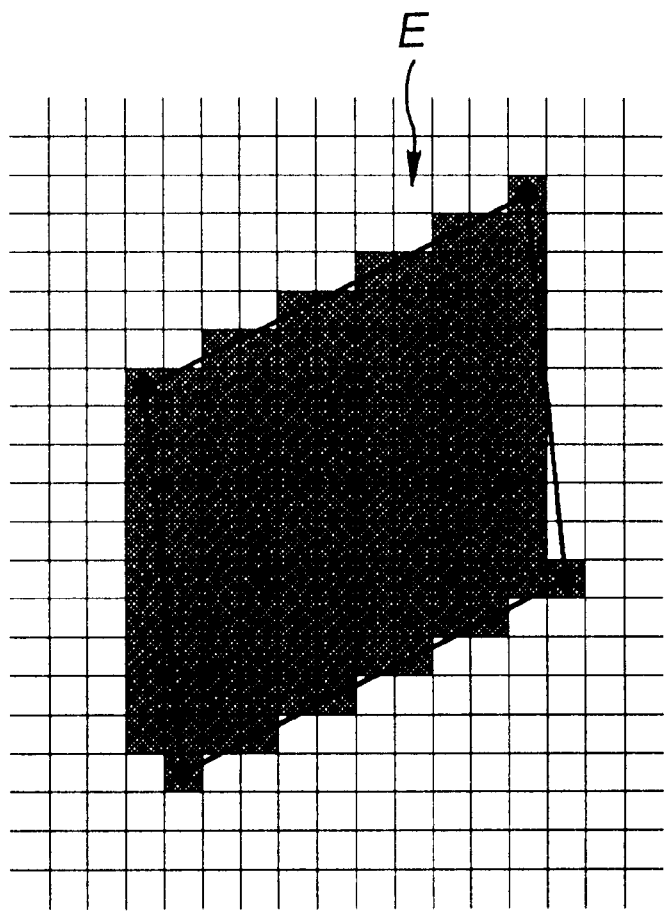
FIG. 5 illustrates the jaggies produced as a result of polygon delineation in accordance with the processing illustrated in FIGS. 3 and 4.

However, as a result of the polygon $P_{201}$ being delineated on the frame buffer by the above-described delineating device, an edge E of the boundary of the polygon $P_{201}$ is jagged, as shown in FIG. 5. This jagged state of the boundary of the polygon is referred to hereinafter as jaggies.

The above-described delineating device employs a sub-pixel method or a background mixing method for eliminating the jaggies.

The sub-pixel method resides in delineating a polygon on the frame buffer with resolution higher than the actual display resolution and passing the polygon through a low-pass filter for decreasing the resolution to the actual display resolution for removing the jaggies.

Figure 6A:
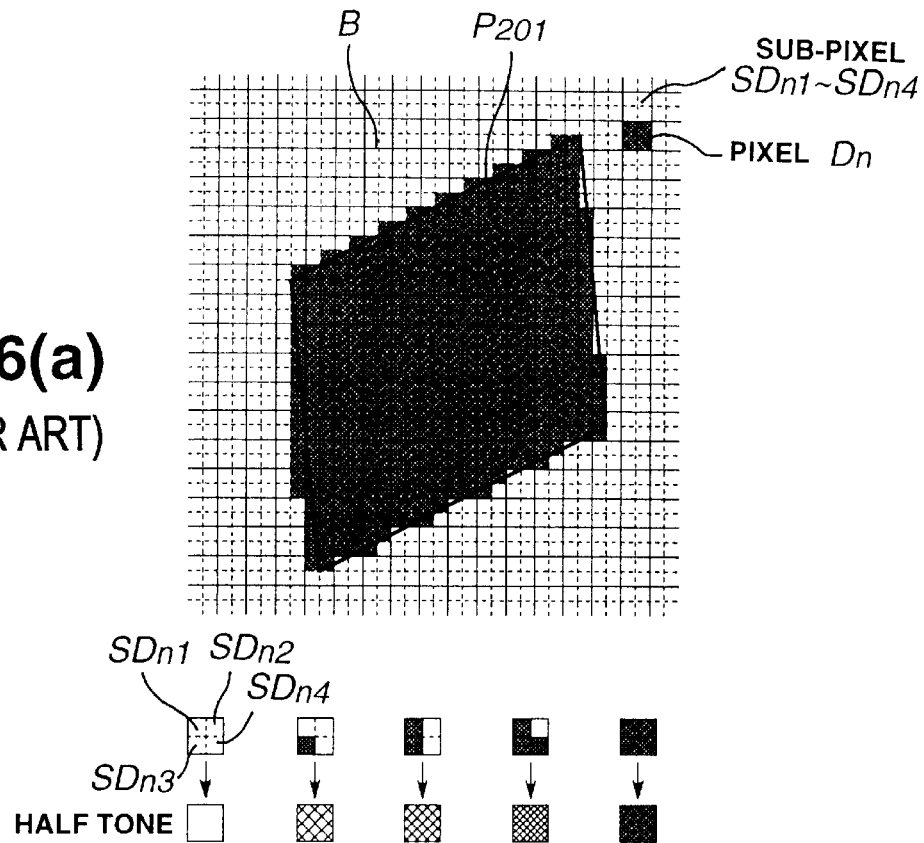
FIGS. 6A and 6B illustrate the prior art sub-pixel method for removing the jaggies.

Specifically, FIG. 6A shows the state in which the polygon $P_{201}$ shown in FIG. 2 has been delineated on the frame buffer with a resolution twice the display resolution in each of the horizontal (H) direction and the vertical (V) direction. That is, the pixel Dn of the frame buffer are associated with 2×2 sub-pixels $SD_{n1}$ to $SD_{n4}$. Therefore, plural colors are contained in the sub-pixels $SD_{n1}$ to $SD_{n4}$. Thus, the average values of the plural colors contained in the sub-pixels $SD_{n1}$ to $SD_{n4}$ are found from pixel to pixel and the average values thus found are adopted as the color of the displayed pixel.

If the background B and the polygon $P_{201}$ are each of the single color, the average values of the plural colors contained in the sub-pixels $SD_{n1}$ to $SD_{n4}$ are one of five-step colors, namely the color corresponding to the sub-pixels $SD_{n1}$ to $SD_{n4}$ being all of the color of the background B, the color corresponding to one of the sub-pixels $SD_{n1}$ to $SD_{n4}$ being of the color of the polygon $P_{201}$, the color corresponding to only two of the sub-pixels $SD_{n1}$ to $SD_{n4}$ being of the color of the polygon $P_{201}$, the color corresponding to only three of the sub-pixels $SD_{n1}$ to $SD_{n4}$ being of the color of the polygon $P_{201}$ and the color corresponding to the sub-pixels $SD_{n1}$ to $SD_{n4}$ being all of the color of the polygon $P_{201}$, as shown in FIG. 6A.

Figure 6B:
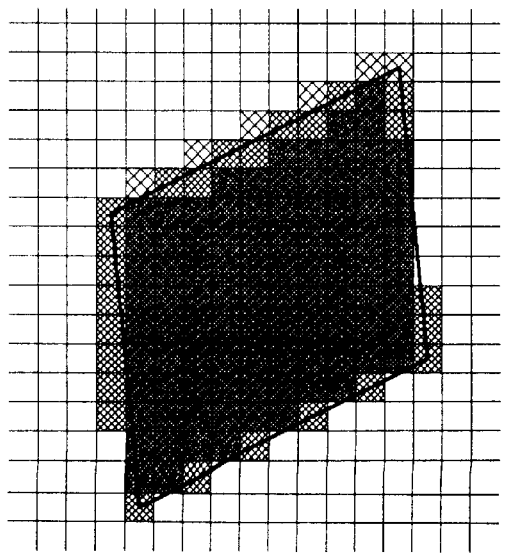

Therefore, the polygon $P_{201}$ is delineated on the frame buffer with display pixels having the five steps of the colors, as shown in FIG. 6B.

However, with the delineating device operating by the above-described sub-pixel method, since delineation needs to be carried out with a resolution higher than the actual display resolution, it is necessary to provide a frame buffer having a resolution higher than actual display resolution, thus increasing the hardware scale of the delineating device.

On the other hand, the background mixing method finds the ratio of the inside portion of a polygon contained in a pixel when the real edge of the polygon intersects the pixel and to mix the color of the polygon with the background color by this ratio for removing the jaggies.

Figure 7:
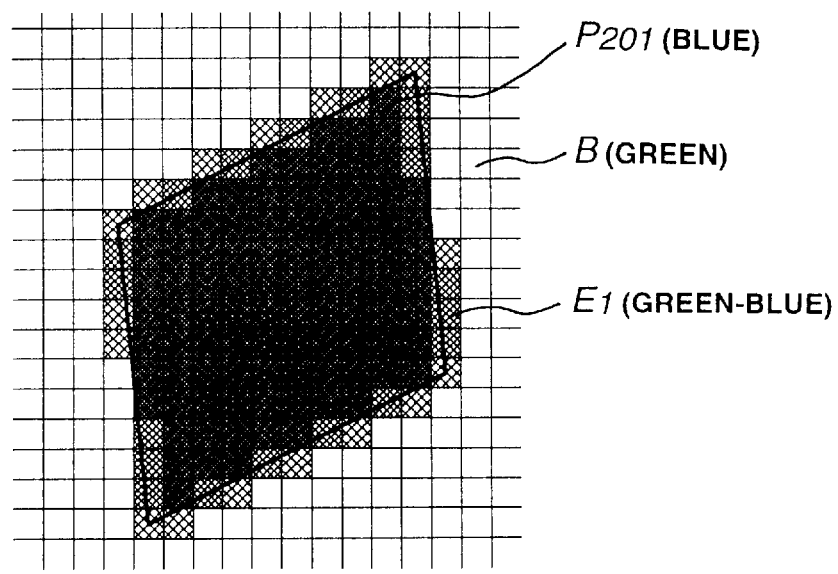
FIG. 7 illustrates the prior background mixing method for removing the jaggies.

Specifically, FIG. 7 shows the state in which the polygon $P_{201}$ shown in FIG. 2 has been delineated on the frame buffer after removing the jaggies by the background mixing method.

For example, if the color of the background B is "green" and the color of the polygon $P_{201}$ is "blue", the color of a pixel $E_1$ of the polygon $P_{201}$ becomes "green-blue".

If the "red" polygon $P_{202}$ is delineated next to the polygon $P_{201}$, the color of the pixel of an edge $E_2$ of the polygon $P_{202}$ becomes "green-red" while the color of the pixel of the edge $E_{12}$ co-owned by the polygon $P_{201}$ and the polygon $P_{202}$ becomes the color "green-blue" of the pixel of the edge E1 added to with "red", that is "green-blue-red".

Since the background B should not be visible at the edge $E_{12}$ co-owned by the polygon $P_{201}$ and the polygon $P_{202}$ the color of the pixel of the edge $E_{12}$ should become "blue-red". However, the color of the edge $E_{12}$ becomes "green-blue-red" thus displaying the color of the background B.

Figure 8:
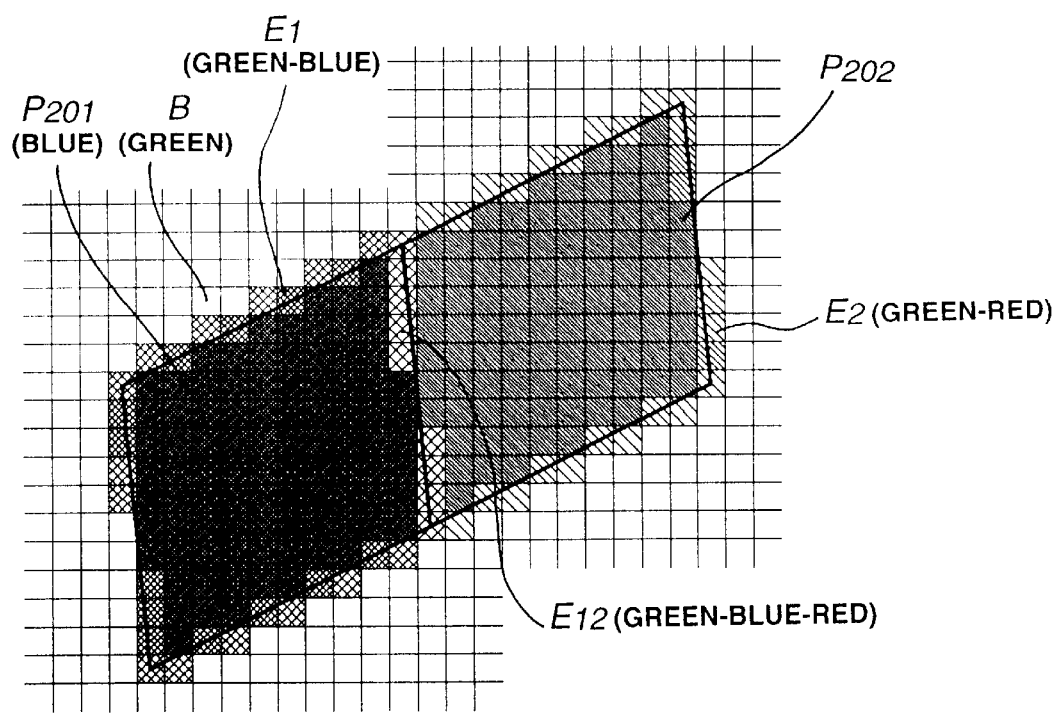
FIG. 8 illustrates removal of jaggies from two neighboring polygons by the background mixing method.

FIG. 8 of the drawings illustrates application of the background mixing method for removal of jaggies from two neighboring polygons.

Hence, with the delineating device employing the above-described background mixing method, the color of the background, which should not be visible, is mixed with the edge color thus producing the bleeding of the background color.

Figure 9:
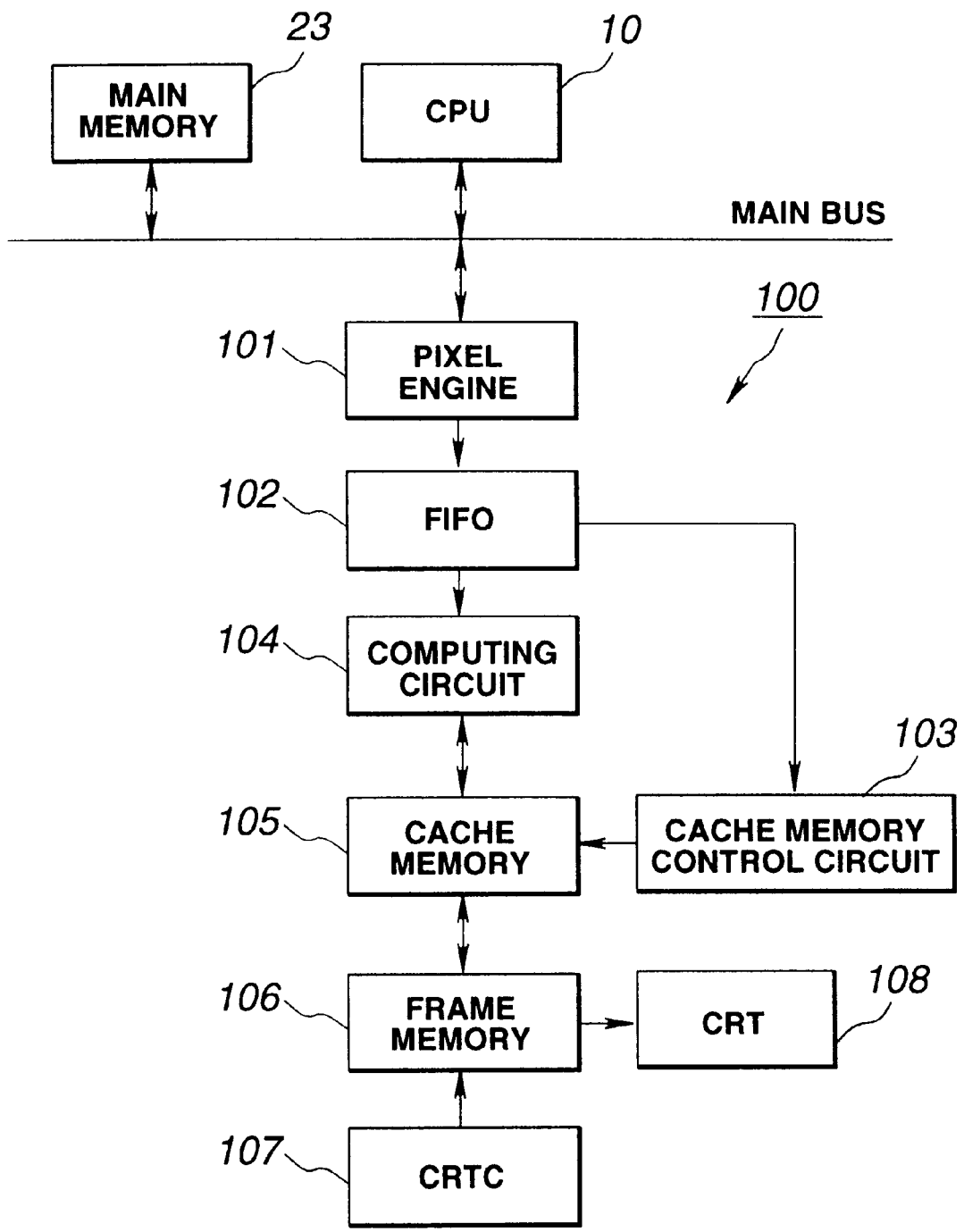
FIG. 9 is a block diagram of a delineating system according to the present invention.

The delineating method according to the present invention is carried out by a delineating device 100 shown in FIG. 9.

The delineating device 100 includes a pixel engine 101, a FIFO (first in first out) buffer 102 fed with an output of the pixel engine 101, a computing circuit 104 fed with an output of the FIFO 102, and a cache memory control circuit 103. The delineating device 100 also includes a cache memory 105 fed with outputs of the computing circuit 104 and the cache memory control circuit 103, and a frame memory 106 connected to the cache memory 105.

A series of operations of the delineating device 100 is next explained.

In a main memory 23 is stored figure data which is thence supplied over a main bus to a CPU 10 where instructions for delineation are generated. To the pixel engine 101 are supplied instructions for delineation from the CPU 10. These instructions for delineation are the instructions, associated with the respective polygons, for defining a three-dimensional model as a combination of basic unit figures, that is polygons, such as triangles or quadrangles, for delineating a three-dimensional image.

The pixel engine 101 interprets the instructions for delineation from the CPU to cause the delineation data to be stored temporarily in the FIFO buffer 102. The delineation data are data made up of the positions in which to write the pixels, Z-values and color values.

The computing circuit 104 reads out delineation data from the FIFO buffer 102 to find the Z-values and colors of all pixels making up the polygon. The color and the Z-values of the pixels thus found are written via cache memory 105 in the frame memory 106. When writing pixel data in the frame memory 106 via the cache memory 105, the computing circuit 104 performs Z-buffer processing, semi-transparent processing, anti-aliasing and filtering.

The computing circuit 104 also reads out pixel data from the frame memory 106 via cache memory 105 and performs an operation of removing jaggies from the thus read-out pixel data.

The operation of removing jaggies by the computing circuit 104 will be explained in detail subsequently.

At this time, the cache memory control circuit 103 controlling the cache memory 105 previously reads the pixel data temporarily stored in the FIFO memory 102 in order to previously recognize the data area required in the cache memory 105. The cache memory control circuit 103 controls the cache memory 105 in order to read out pixel data of the above data area collectively without the read-out pixel data being astride the word boundary and the page boundary of the frame memory 106 and in order to write the pixel data for the data area collectively in the frame memory 106. This enables the cache memory 105 to have access to the frame memory 106 in a shorter accessing time and by a smaller number of accessing operations.

Although not shown, the frame memory 106 is made up of a Z-buffer and a frame buffer. The Z-buffer is a buffer for storing the Z-values contained in the pixel data, while the frame buffer is a buffer for storing color values contained in the pixel data.

Thus, the frame memory 106 is accessed by the cache memory 105, under control of the cache memory control circuit 103, so that pixel data is written from the computing circuit 104 via cache memory 105, while data written in the frame memory is outputted via cache memory 105 to the computing circuit 104.

A CRT controller 107 reads out written pixel data, that is delineated pixel data, from the frame memory 106, and transforms the pixel data into video signals which are then supplied to a television receiver or a monitor receiver 108.

This causes an image corresponding to the pixel data from the frame memory to be displayed on a television receiver or a monitor receiver.

The operation for removing jaggies by the computing circuit 104 is next explained in detail.

Figure 10:
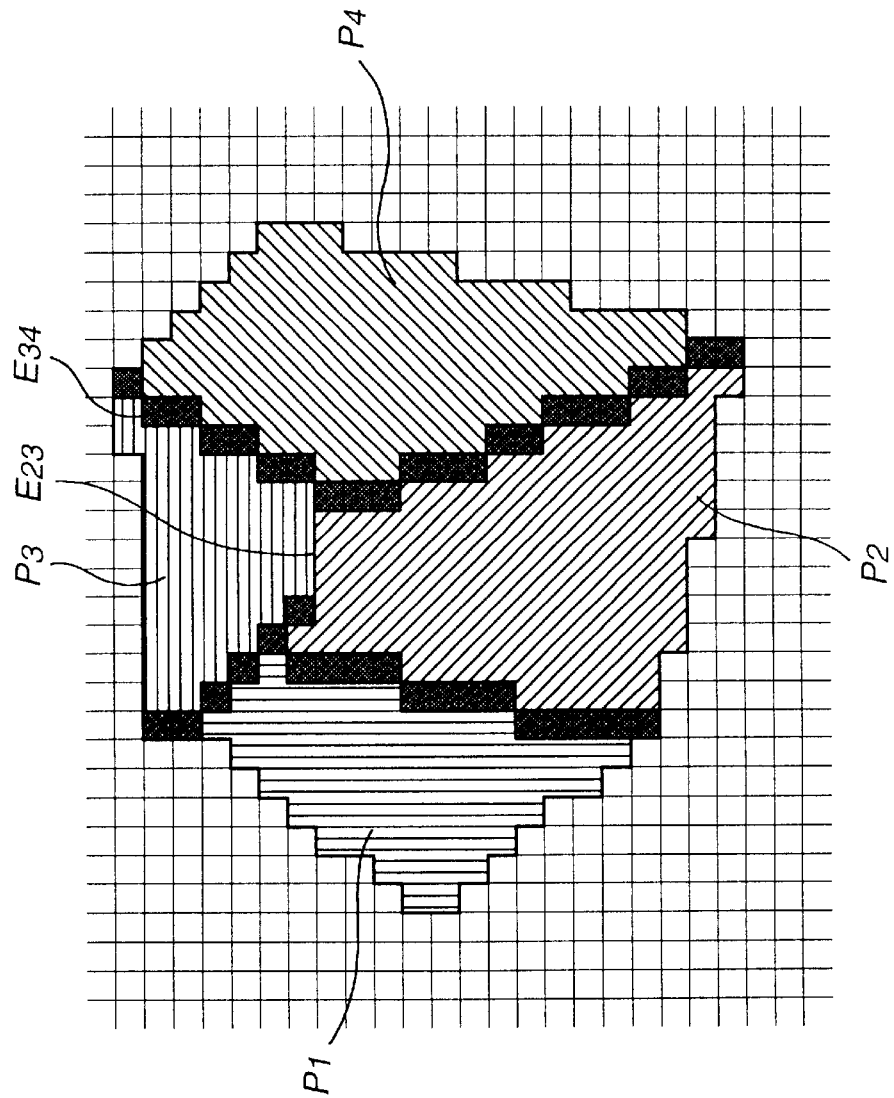
FIG. 10 illustrates the state of presence of edge overlapping in a polygon being delineated.

When a three-dimensional model, made up of four polygons $P_1$ to $P_4$ shown in FIG. 10, is delineated on the frame memory 106, the computing circuit 104 causes the polygons $P_1$ to $P_4$ to be delineated via cache memory 105 on the frame memory 106 without performing the operation of removing the jaggies.

The state of the polygons $P_1$ to $P_4$, delineated on the frame memory 106, is such that, on an edge $E_{34}$ co-owned by the polygons $P_3$ and $P_4$, the pixels of the edge of the polygon $P_3$ are overlapped with those of the edge of the polygon $P_4$, whereas, on an edge $E_{23}$ co-owned by the polygons $P_2$ and $P_3$, the pixels of the edge of the polygon $P_2$ are not overlapped with but are directly adjacent to those of the edge of the polygon $P_3$. That is, at the edge on which the apex points of the polygons are co-owned, the polygons are arrayed without gap in-between.

Figure 11:
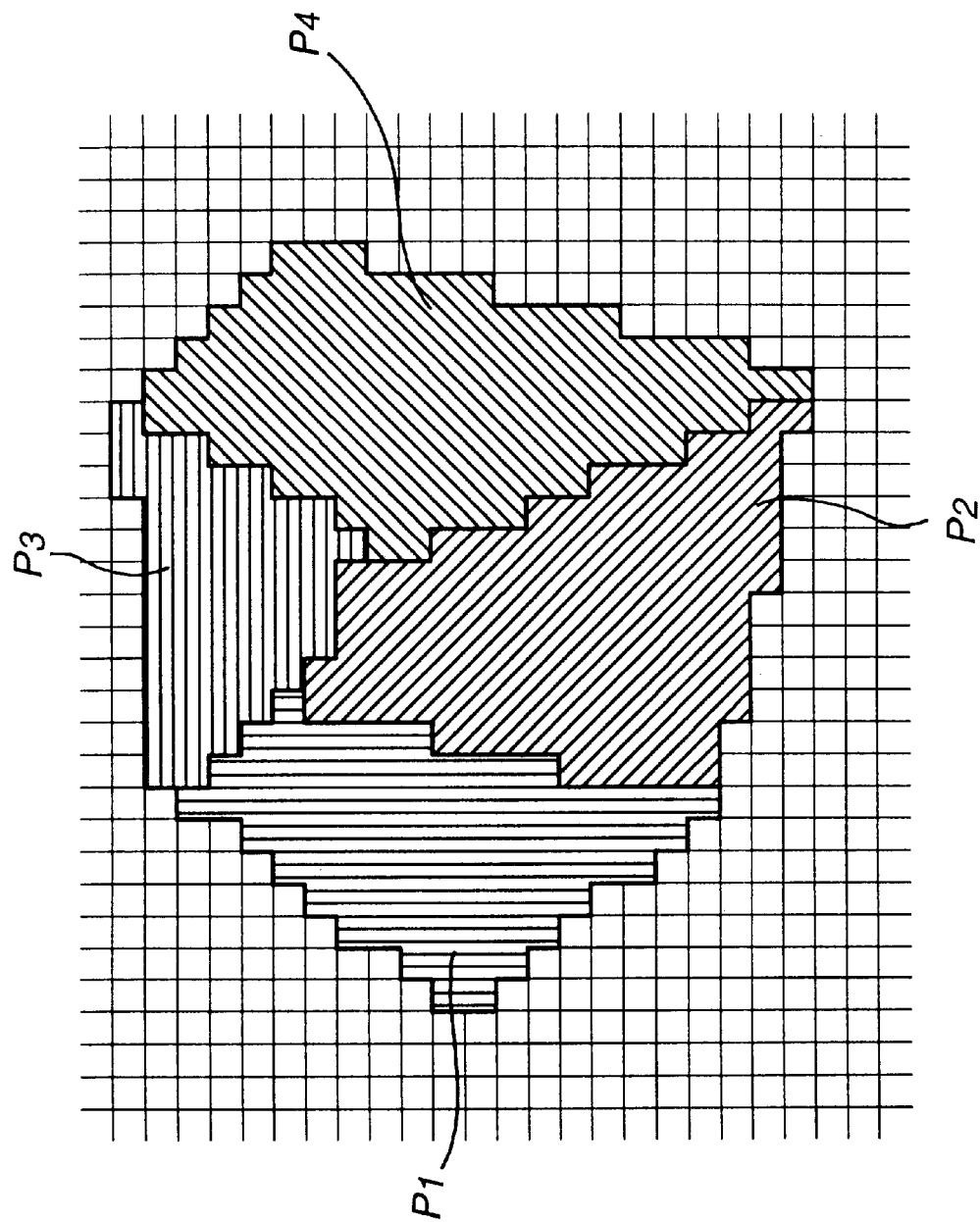
FIG. 11 illustrates a polygon delineated without performing the processing for removing the jaggies.

Thus, if the polygons are delineated in the sequence of the polygons $P_1$, $P_2$, $P_3$ and $P_4$ on the frame memory 106, pixels of the polygons delineated later are written on an edge co-owning the apex points of the polygons, as shown in FIG. 11.

The computing circuit 104 then interconnects the apex points of the polygons $P_1$ to $P_4$ delineated on the frame memory 106 without performing the operations of removing the jaggies.

That is, the computing circuit 104 interconnects apex points $Q_1$ and $Q_2$ constituting edges of adjacent portions of two neighboring polygons $P_3$ and $P_4$ to form a line segment $L_{12}$. The line segment $L_{12}$, thus formed by interconnecting the apex points $Q_1$ and $Q_2$, is a smooth line segment having a width corresponding to a pixel.

The computing circuit 104 selects two pixels closest to the line segment $L_{12}$, depending on the direction of the line segment, and delineates the pixels on the frame memory 106 via cache memory 105 with weighting corresponding to the distance from the line segment $L_{12}$.

Figure 12:
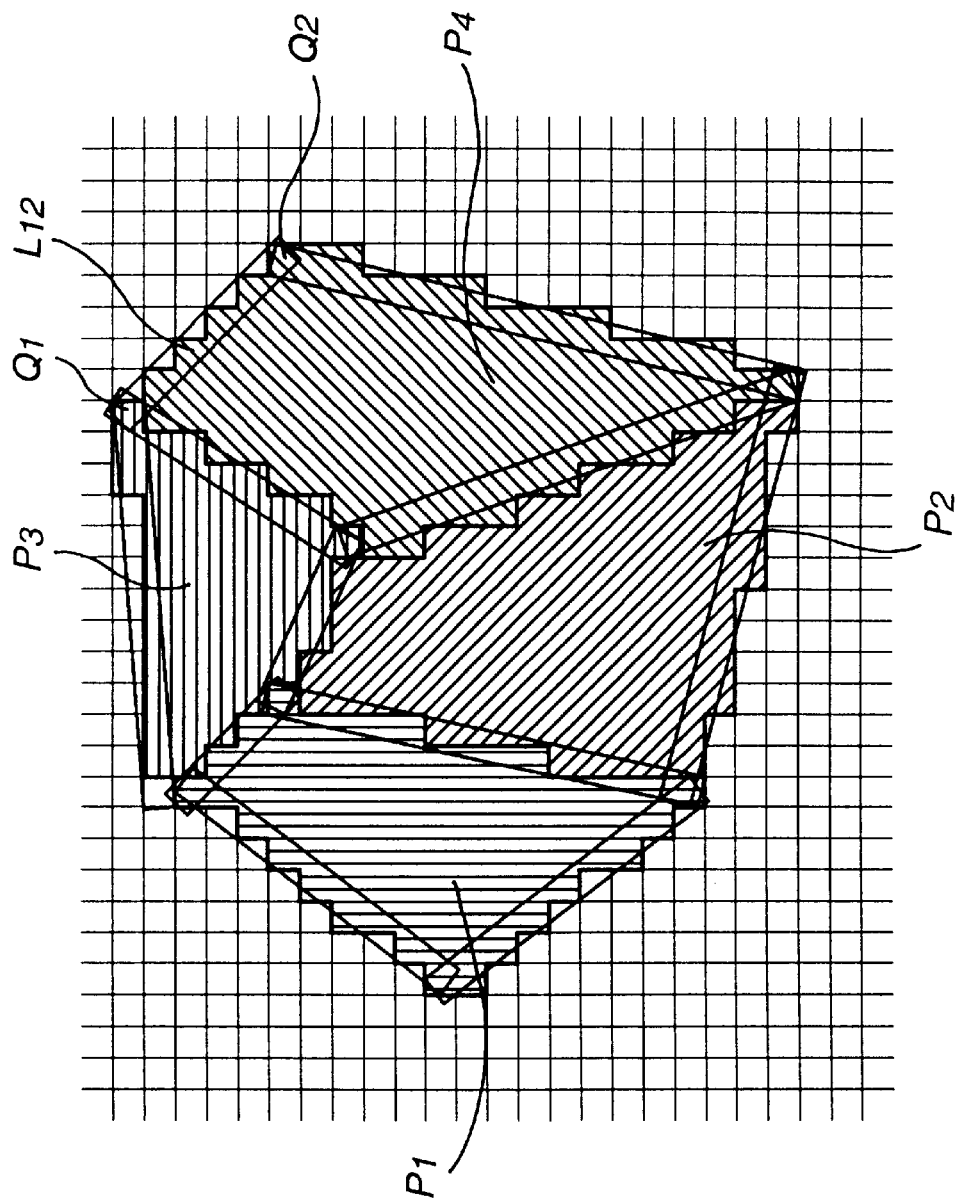
FIG. 12 illustrates the state in which the apex points making up an edge are interconnected in the method for removing the jaggies.

As for the line segments obtained on interconnecting the apex points of the other edges, the computing circuit 104 delineates pixels via cache memory 105 on the frame memory 106, in much the same way as for the line segment $L_{12}$ obtained on interconnecting the apex points $Q_1$ and $Q_2$, as shown in FIG. 12.

As described above, the computing circuit 104 delineates a polygon on the frame memory 106 without performing the operation of removing the jaggies, and subsequently overwrites a smooth line segment obtained on interconnecting apex points constituting an edge of the polygons, for removing the jaggies of the polygons.

Figure 13:
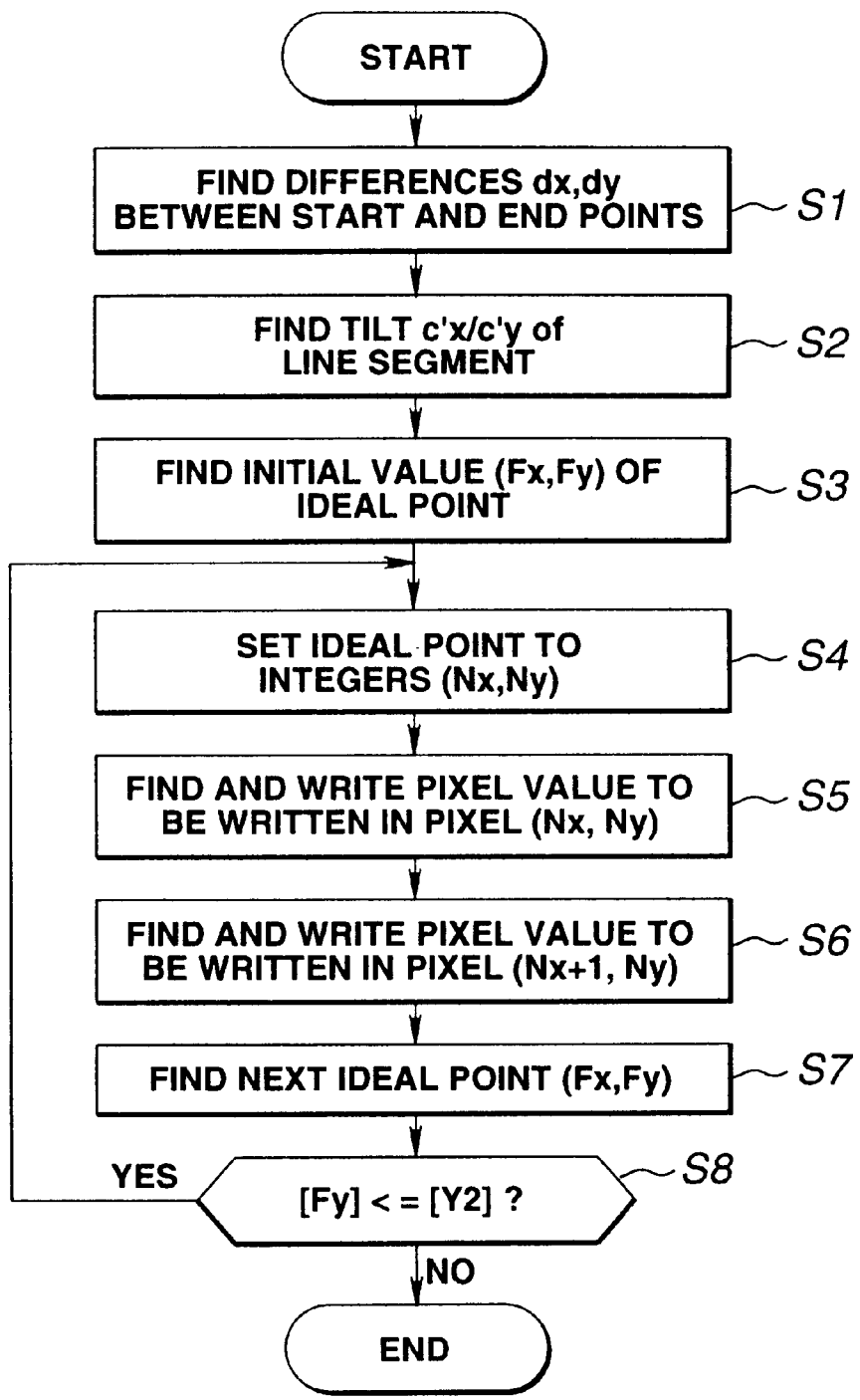
FIG. 13 is a flowchart for illustrating the processing for removing the jaggies.

FIG. 13 shows, in a flowchart, the processing for removing the jaggies of the computing circuit 104. Referring to FIG. 13, the processing for removing the jaggies of the computing circuit 104 is specifically explained.

Figure 14:
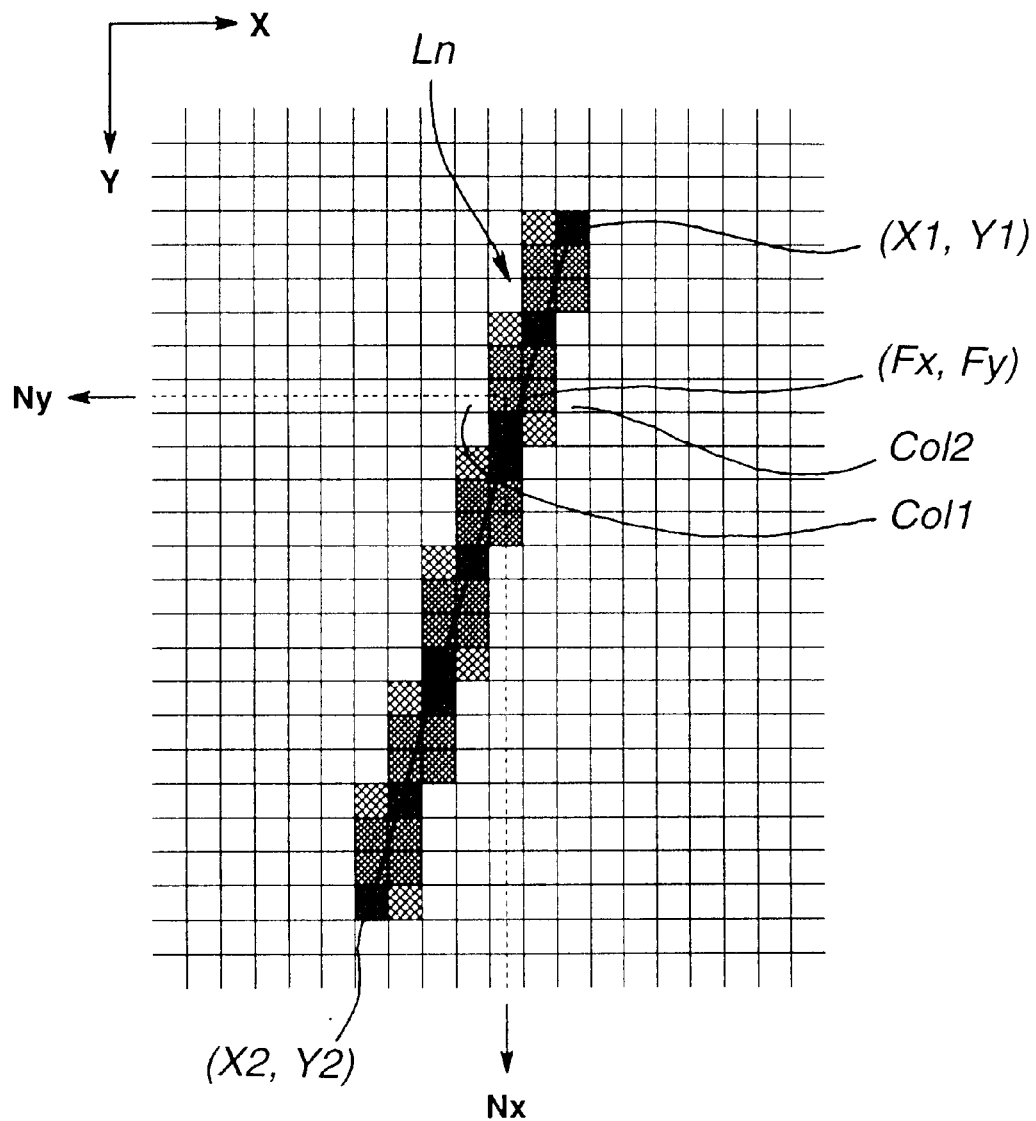
FIG. 14 illustrates delineation of a line segment close to a vertical line.

It is assumed that a smooth line segment obtained on interconnecting the apex points constituting the edge of the polygon is a nearly vertical line segment Ln as shown in FIG. 14, and this line segment Ln is delineated from above towards below. Then, a starting point and a terminal point of the line segment Ln are set as (X1, Y1) and (X2, Y2), respectively. A difference dx and a difference dy of the starting point (X1, Y1) and the end point (X2, Y2) on the x-axis and on the y-axis are then found at step S1 by $$dx=X2-X1$$

$$dy=Y2-Y1$$

Then, using the differences dx, dy as found at the step S1, the gradient S of the line segment Ln is found at step S2 by $$S=dx/dy.$$

Next, initial values of an ideal point (Fx, Fy) are set at step S3 so that $$Fx=X1$$

$$Fy=Y1.$$

Next, the ideal point expressed in integers (Nx, Ny), obtained from the ideal points (Fx, Fy), are found at step S4 by $$Nx=[Fx]$$

$$Ny=[Fy].$$

where "[ ]" denotes the Gaussian symbol.

The values of pixels written in (Nx, Ny) obtained at step S4 are found and the pixel values thus found are written at step S5 at (Nx, Ny).

If now the value of a pixel (Nx−1, Ny) adjacent to (Nx, Ny) is Col1 and the value of the pixel of the ideal point (Fx, Fy) on the line segment Ln is Col0, the value of the pixel Col_L may be found by $$Col\_L=(Fx-Nx)*Col1+(1-Fx+Nx)*Col0.$$

Then, the value of a pixel written in (Nx+1, Ny) adjacent to (Nx, Ny) is found and the pixel value thus found is written at step S6 in (Nx+1, Ny).

If now the value of a pixel (Nx+2, Ny) adjacent to (Nx+1, Ny) is Col2 and the value of the pixel of the ideal point (Fx, Fy) on the line segment Ln is Col0, the value of the pixel Col_R written in (Nx+1, Ny) may be found by $$Col\_R=(Fx-Nx)*Col0+(1-Fx+Ny)*Col2.$$

Next, the next ideal point (Fx, Fy) is found at step S7 by $Fx=Fx+(dx/dy)$ $Fy=Fy+1$.

It is then judged whether or not the value of "Fy" as obtained at S7 is not larger than the value of the Y-coordinate (=Y2) of a terminal point (X2, Y2) of the line segment Ln. That is, it is judged at step S8 whether or not the operation of writing the pixels at each ideal point (Fx, Fy) up to the terminal point of the line segment Ln has come to a close.

If it is judged at step S8 that the writing of the pixel in each ideal point (Fx, Fy) up to the terminal point of the line segment Ln has not come to a close, processing reverts to step S4 to perform the processing for steps S4 to S8.

If it is judged at step S8 that the writing of the pixel in each ideal point (Fx, Fy) up to the terminal point of the line segment Ln has come to a close, the processing for the present flowchart comes to a close.

As described above, the computing circuit 104 is designed so that two pixels perpendicular to the direction of the line segment Ln and closest to the ideal point (Fx, Fy) (=(Nx, Ny), (Nx+1, Ny)), will be delineated as line segment Ln.

In the computing circuit 104, which of the two pixels should be used as two pixels (=(Nx, Ny), (Nx+1, Ny)) to be delineated as the line segment Ln is determined depending on whether the direction of the line segment Ln is closer to the horizontal or to the vertical.

Figure 15:
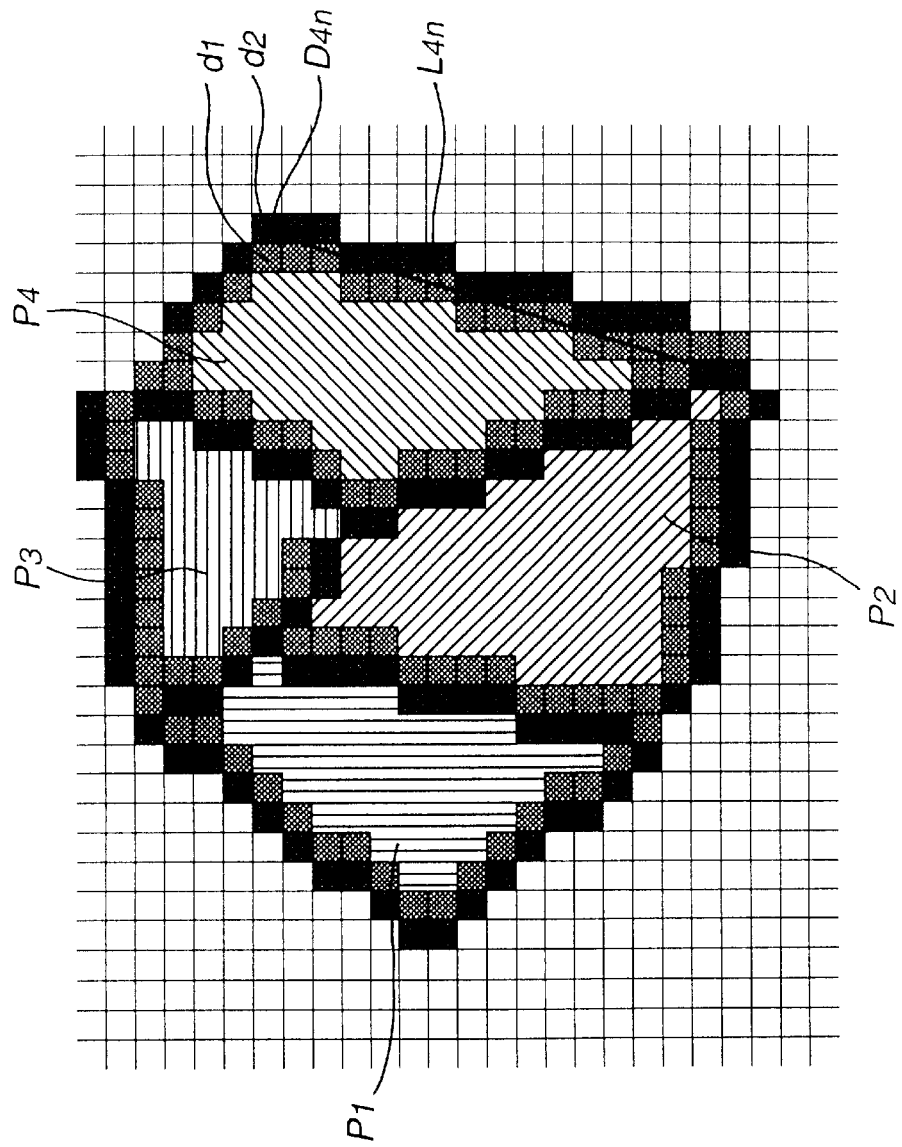
FIG. 15 illustrates the state in which the polygon has been drawn by the above operation for removing the jaggies.

Therefore, after processing for removing the jaggies by the computing circuit 104, the edges of the polygons $P_1$ to $P_4$ in FIG. 11 are overwritten by smooth line segments, as shown in FIG. 15.

That is, since the computing circuit 104 delineates two pixels perpendicular to the direction of the line segment at the position of each pixel on the smooth line segment, two pixels $d_1, d_2$, perpendicular to a smooth line segment $L_4n$ on, for example, the polygon $P_4$, are delineated on an arbitrary pixel $D_4n$ on the smooth line segment $L_4n$.

As described above, since the edges of all polygons are overwritten with the delineating device 100 by smooth line segments, it is possible with the delineating device 100 to remove the jaggies of an object made up of plural polygons easily.

In addition, since the delineating device 100 after performing the delineating operation without removing the jaggies performs the processing for removing jaggies as shown by the flowchart of FIG. 13, it becomes possible with the delineating device 100 to prevent display of the color which should not inherently be displayed, such as the background color.

Thus, it is possible with the delineating device 100 to perform delineation to high precision without increasing the hardware scale.

The color of each overwritten pixel on the smooth line segment in the processing for removing jaggies as shown in the flowchart of FIG. 13 may be a common color for the entire line segment. However, different colors may be used for the respective pixels. This enables the above-described processing for removing the jaggies to be applied to the line segment processed with texture mapping, while enabling the processing for removing the jaggies to be applied to the polygon processed with such texture mapping.

If, in the above-described processing for removing jaggies as shown in the flowchart of FIG. 13, a smooth line segment is overwritten on a polygon edge, a pixel of a line segment interpolated with a pixel on the outer side of the polygon is overwritten by another polygon, it is possible to overwrite a smooth line segment for each polygon.

Figure 16:
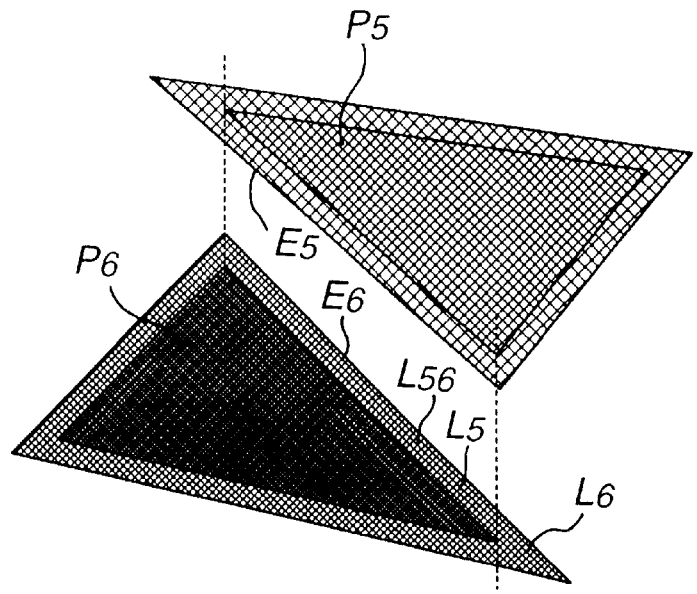
FIG. 16 illustrates the operation for removing the jaggies in case a smooth line segment on the outer side of a polygon is overwritten by another polygon.

Specifically, for delineating two polygons $P_5$, $P_6$, since an edge $E_5$ of the polygon $P_5$ coincides with an edge $E_6$ of the polygon $P_6$, a portion $L_{56}$ of the polygon $P_5$ coincident with an edge $E_5$ of the polygon $P_5$, which portion $L_{56}$ is a portion of a smooth line segment $L_6$ for the polygon $P_6$, is overwritten by a smooth line segment $L_5$ for the polygon $P_5$, as shown in FIG. 16.

In such case, in the above-described processing for removing jaggies, smooth line segments $L_5$, $L_6$ are overwritten for each of the polygons $P_5$, $P_6$. In this manner, it becomes possible with the delineating device 100 to prevent background bleeding.

The color of the pixel of the smooth line segment can also be interpolated with the color of the background pixel. In this manner, background bleeding can be prevented from occurring if, in the delineating device 100, the pixel of the smooth line segment overwritten on a given polygon is overwritten by another polygon.

Also, for a pixel completely overwritten by a neighboring polygon in the processing for removing jaggies shown in the flowchart of FIG. 13, it is possible to write the color of a pixel obtained on mixing the color of the pixel with the background pixel color, while it is possible to overwrite a smooth line segment for pixels other than those completely overwritten by the neighboring polygon.

Figure 17:
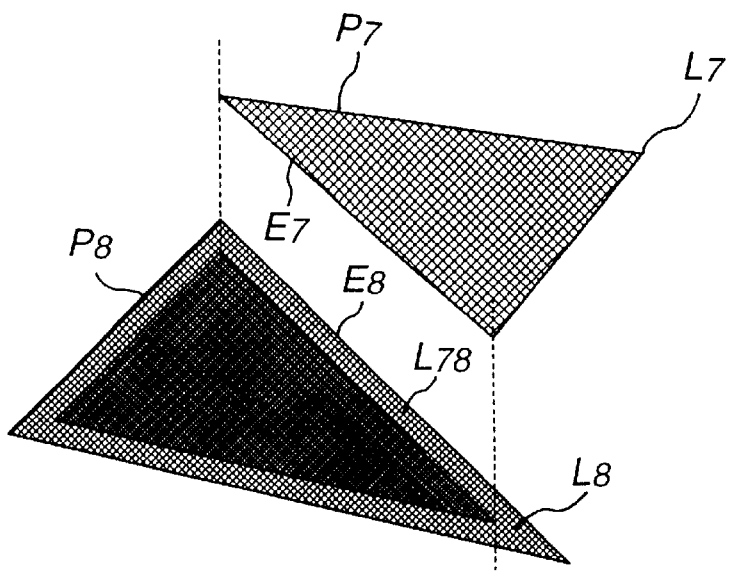
FIG. 17 illustrates the operation for removing the jaggies in case a smooth line segment on the inner side of a polygon is overwritten by another polygon.

Specifically, when delineating two polygons $P_7$ and $P_8$, shown in FIG. 17, since an edge $E_7$ of a polygon $P_7$ is overlapped with an edge $E_8$ of a polygon $P_8$, a portion $L_{78}$ of a smooth line segment $L_8$ for a polygon $P_8$ overlapped with an edge $E_7$ of the polygon $P_7$ is completely overwritten by the polygon $P_7$.

In such a case, the color of a pixel obtained on mixing the color of the pixel of the portion $L_{78}$ with the color of the background pixel is written for the portion $L_{78}$, while a smooth line segment $L_8$ is overwritten for pixels other than the pixels of the portion $L_{78}$. That is, in the above-described processing for removing the jaggies, the smooth line segment is overwritten only on a horizontal edge in overwriting a smooth line segment.

Figure 18:
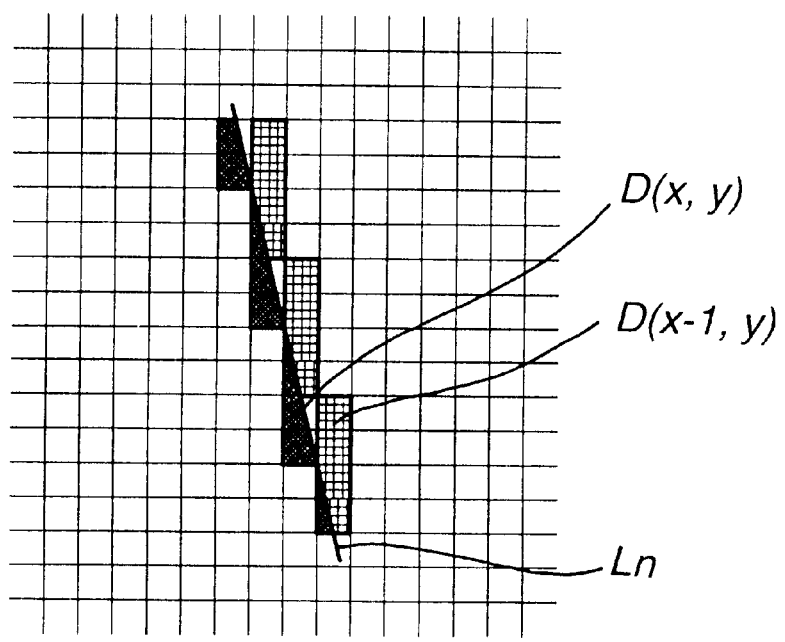
FIG. 18 illustrates changing pixels interpolated by the intersection area.

In the processing for removing the jaggies shown in the flowchart of FIG. 13, the color of the pixel interpolated with the color of a line segment may be selected in the following manner:

For example, pixels D(x, y) on a smooth line segment Ln are weighted by an area of intersection of the line segment Ln, so that, if the area of intersection of the pixel D(x, y) is not less than [0.5], a pixel D(x−1, y) adjacent to the pixel D(x, y) is used as a pixel for interpolation, as shown in FIG. 18.

By selecting the pixel for interpolation depending on the weight of the color of a line segment, different values are necessarily assumed even if the same pixel is co-owned by mutually neighboring polygons, thus preventing background bleeding.

Hence, the present invention satisfies a long existing need for enhanced image processing delineation which reduces jaggies and background bleed and has minimal hardware requirements.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. In a computer graphics system having a frame memory corresponding to a pixel grid on a display, a method for delineating a polygon having at least one jagged edge, said method comprising the steps of:

forming, on said frame memory, a first line segment along said jagged edge of said polygon;

determining the slope of said first line segment;

if said slope is closer to the horizontal of said grid than to the vertical of said grid, for each column of pixels along the length of said first line segment, forming a second line segment comprised of a plurality of pixels closest to said first line segment, a portion of each of said second line segments overwriting a portion of said polygon; and if said slope is closer to the vertical of said grid than to the horizontal of said grid, for each row of pixels along the length of said first line segment, forming a second line segment comprised of a plurality of pixels closest to said first line segment, a portion of each of said second line segments overwriting a portion of said polygon.

2. The delineating method as recited in claim 1, wherein said step of forming second line segments further includes the step of finding the values of the second-line-segment pixels from the values of pixels lying on said first line segment.

3. The delineating method as recited in claim 2, wherein said step of forming second line segments further includes the step of finding the values of the second-line-segment pixels by interpolation using the values of pixels adjacent the pixels lying on said first line segment.

4. The delineating method as recited in claim 1 or 2, wherein said step of forming second line segments further includes the step of finding the values of the second-line-segment pixels by selecting plural pixels proximate to said first line segment and finding the values of the respective second-line-segment pixels using the values of the proximate pixels.

5. For use in a graphics system having a frame memory corresponding to a pixel grid on a display, an apparatus for delineating a polygon having at least one jagged edge, said apparatus comprising:

means for forming, on said frame memory, a first line segment along said jagged edge of said polygon;

means for determining the slope of said first line segment;

first means for forming, when said slope is closer to the horizontal of said grid than to the vertical of said grid, for each column of pixels along the length of said first line segment, a second line segment comprised of a plurality of pixels closest to said first line segment, wherein a portion of each of said second line segments overwrites a portion of said polygon; and second means for forming, when said slope is closer to the vertical of said grid than to the horizontal of said grid, for each row of pixels along the length of said first line segment, a second line segment comprised of a plurality of pixels closest to said first line segment, wherein a portion of each of said second line segments overwrites a portion of said polygon.

6. The delineating apparatus as recited in claim 5, wherein said second means includes means for finding the values of the second-line-segment pixels from the values of pixels lying on said first line segment.

7. The delineating apparatus as recited in claim 6, wherein said second means includes means for finding the values of the second-line-segment pixels by interpolation using the values of pixels adjacent the pixels lying on said first line segment.

8. The delineating apparatus as recited in claim 5 or 6, wherein said second means includes means for finding the values of the second-line-segment pixels by selecting plural pixels proximate to said first line segment and finding the values of the respective second-line-segment pixels using the values of the proximate pixels.

9. A computer graphics system for delineating an image object made of a plurality of polygons, said polygons having at least one neighboring edge, said object located on a background, said system comprising:

a picture memory;

means for supplying delineating instructions;

means for forming, on said picture memory, a plurality of first line segments along the neighboring edges of the polygons and along the edges of the polygons which interface with the background, said first means responsive to said delineating instructions;

means for determining the slope of said first line segments;

means for forming, when said slope is closer to the horizontal of said grid than to the vertical of said grid, for each column of pixels along the length of said first line segment, a second line segment comprised of a plurality of pixels closest to said first line segment, wherein a portion of each of said second line segments overwrites a portion of said polygon;

means for forming, when said slope is closer to the vertical of said grid than to the horizontal of said grid, for each row of pixels along the length of said first line segment, a second line segment comprised of a plurality of pixels closest to said first line segment, wherein a portion of each of said second line segments overwrites a portion of said polygon; and means for outputting the information of a delineated picture from said picture memory.

10. The system as recited in claim 9, wherein said second means includes means for finding the values of the second-line-segment pixels from the values of pixels lying on said first line segment.

11. The system as recited in claim 10, wherein said second means includes means for finding the values of the second-line-segment pixels by interpolation using the values of pixels adjacent the pixels lying on said first line segment.

12. The system as recited in claim 9 or 10, wherein said second means includes means for finding the values of the second-line-segment pixels by selecting plural pixels proximate to said first line segment and finding the values of the respective second-line-segment pixels using the values of the proximate pixels.

13. A method for delineating an image object made of a plurality of polygons having at least one neighboring edge, said object located on a background, said method comprising the steps of:

forming a plurality of first line segments along the neighboring edges of the polygons and along the edges of the polygons which interface with the background;

determining the slope of said first line segments;

if said slope is closer to the horizontal of said grid than to the vertical of said grid, for each column of pixels along the length of said first line segment, forming a second line segment comprised of a plurality of pixels closest to said first line segment, a portion of each of said second line segments overwriting a portion of said polygon; and if said slope is closer to the vertical of said grid than to the horizontal of said grid, for each row of pixels along the length of said first line segment, forming a second line segment comprised of a plurality of pixels closest to said first line segment, a portion of each of said second line segments overwriting a portion of said polygon.

* * * * *

UNITED STATES PATENT AND TRADEMARK OFFICE
CERTIFICATE OF CORRECTION

PATENT NO.   : 6,052,131
DATED        : April 18, 2000
INVENTOR(S)  : Masaaki Oka Page 1 of 1

It is certified that error appears in the above-identified patent and that said Letters Patent is hereby corrected as shown below:

Column 1,
Lines 4 through 6, delete entire paragraph.

Signed and Sealed this

Thirteenth Day of November, 2001

Attest:

*Nicholas P. Godici*

NICHOLAS P. GODICI
*Acting Director of the United States Patent and Trademark Office*

*Attesting Officer*